April 29, 1958  A. H. VAN VOOREN  2,832,242
ROTARY WORK INDEXING MACHINE
Filed March 15, 1956  6 Sheets-Sheet 3

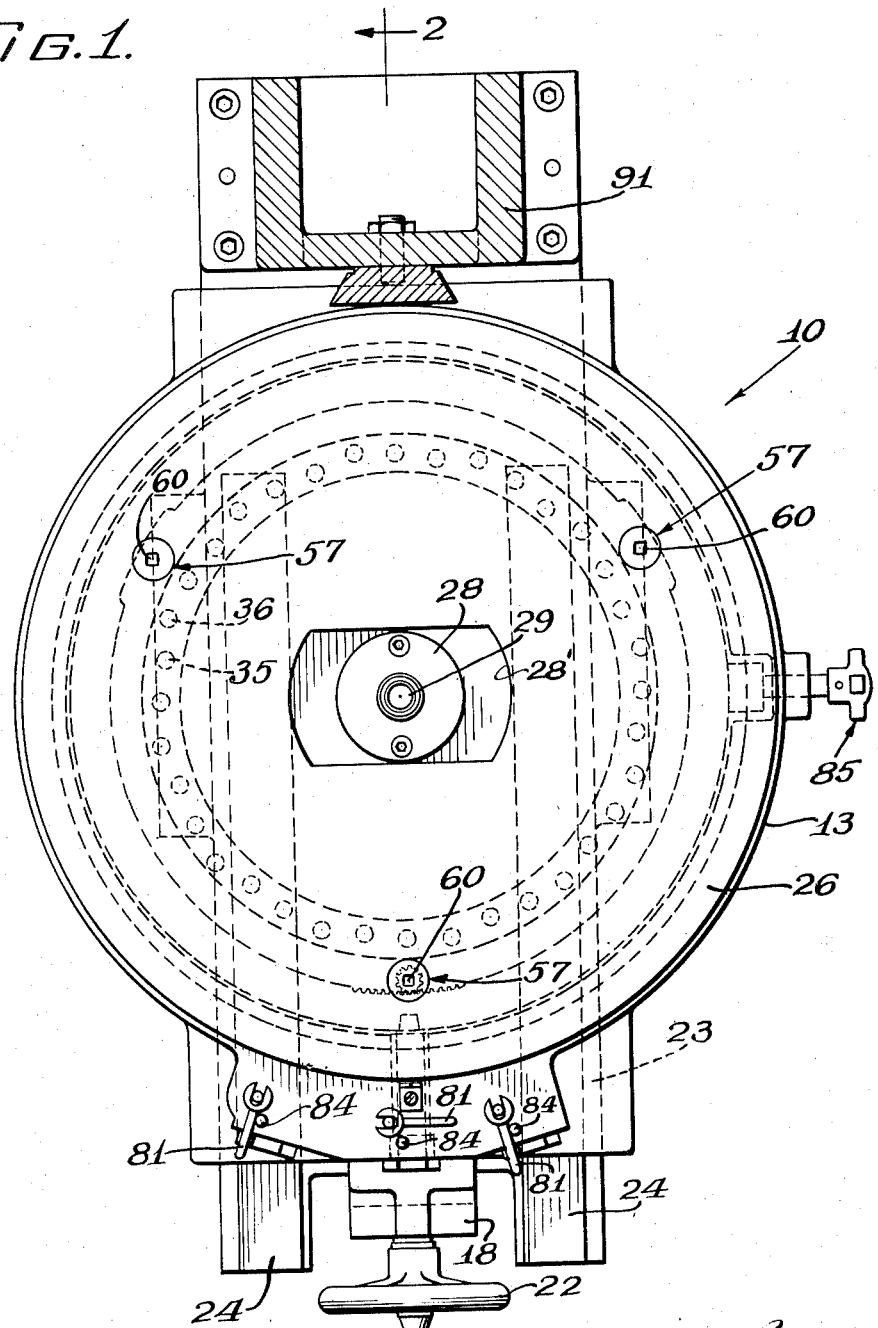

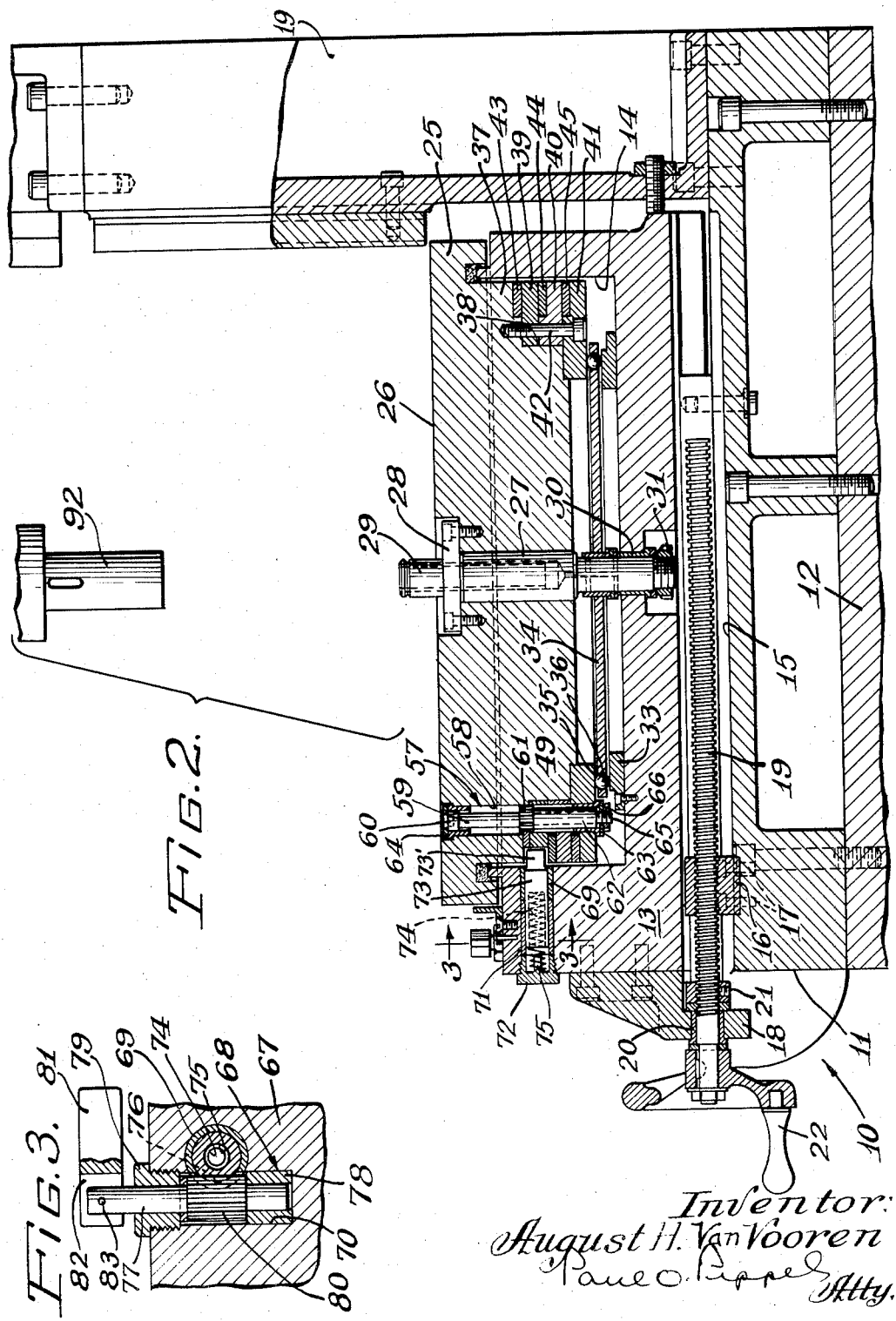

Inventor:
August H. Van Vooren
Paul O. Pippel
Atty.

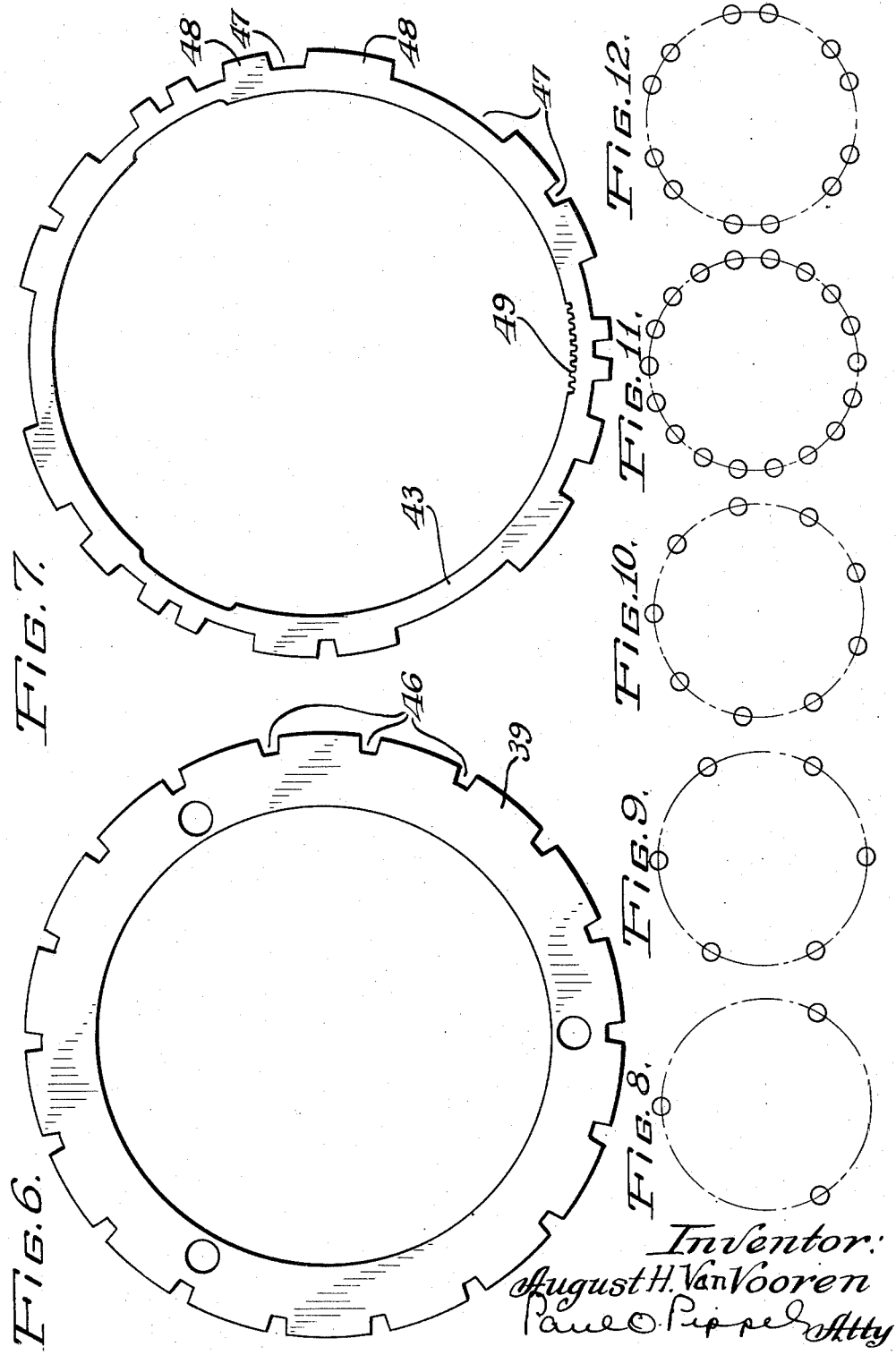

April 29, 1958 A. H. VAN VOOREN 2,832,242
ROTARY WORK INDEXING MACHINE
Filed March 15, 1956 6 Sheets-Sheet 5
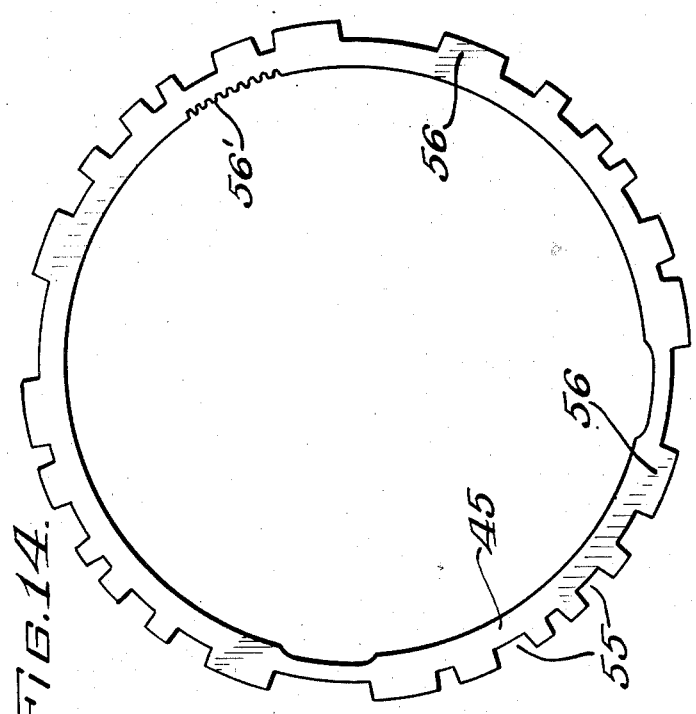
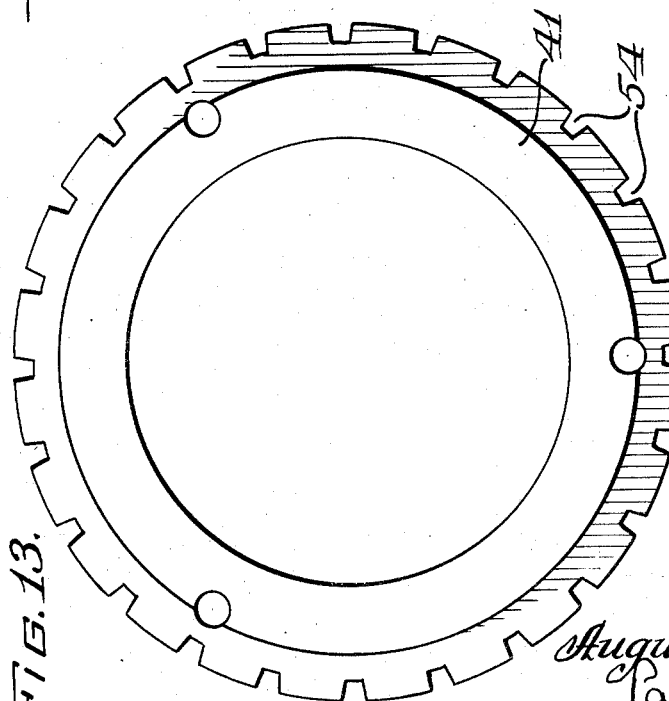
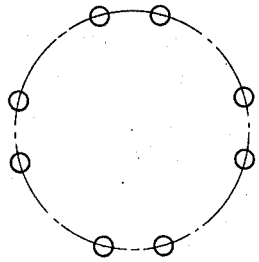
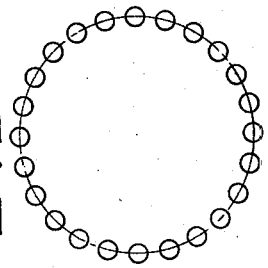
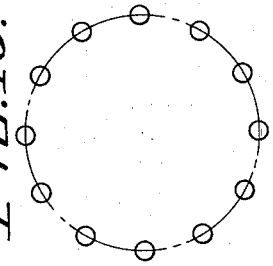
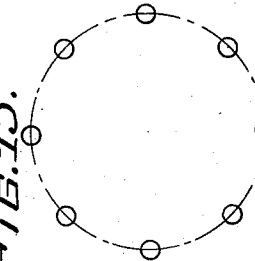
Inventor:
August H. Van Vooren
Paul O. Pippel
Atty.

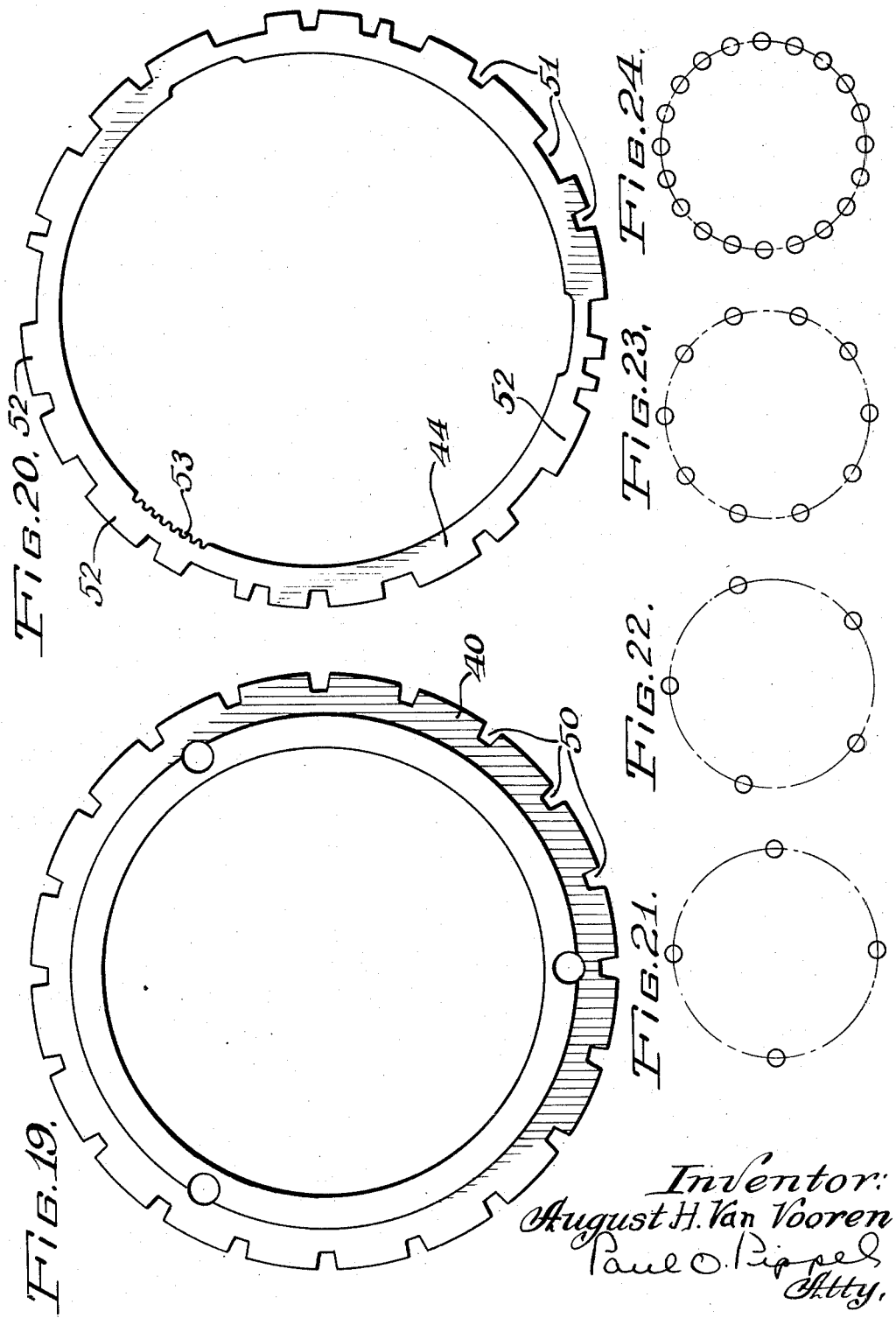

United States Patent Office 2,832,242
Patented Apr. 29, 1958

2,832,242
ROTARY WORK INDEXING MACHINE
August H. Van Vooren, Evanston, Ill.
Application March 15, 1956, Serial No. 571,748
5 Claims. (Cl. 77—64)

This invention relates to a work indexing machine or fixture. More particularly the invention relates to an indexing device particularly adapted for co-operation with a drill press, milling machine, or similar device.

In certain machine operations, such as drilling for example, it is extremely desirable to have a work holding fixture which can be quickly and easily adapted for holding work in a number of different positions. Such a device is particularly useful in the manufacture of flywheels, or clutch plates, for use with various internal combustion engines. Generally, clutches or flywheels of various makes for use with different engines, utilize different mounting holes which must be drilled. The conventional practice is to utilize different drill fixtures for locating the different holes in the flywheels. Such fixtures generally are very expensive and difficult to handle and they must be changed whenever a different flywheel is delivered to the operator. Naturally, such procedures are time-consuming and it is the prime object of this invention to provide an improved drill fixture or machine which is readily adapted for quick changeovers and which may be utilized for placing a work piece in a great variety of positions with respect to a drill press or other metal working device.

Still another object of this invention is to provide a rotary indexing table particularly adapted for locating clutch elements or similar devices in a number of positions for drilling operation.

A still further object is to provide an indexing fixture including a rotatable table having a plurality of self-contained indexing members adapted to be adjusted to a number of positions whereby the table may be rotated to and locked in several or many positions depending on the number and spacing of holes which are to be drilled in the work piece located on the table.

A still further object is to provide an improved rotary indexing table for drill presses and the like, the said table including improved indexing elements adapted to be easily and quickly adjusted so that the table may be locked in various positions for accommodating various work pieces to be drilled.

These and further objects will become more readily apparent from a reading of the description when examined in connection with the accompanying sheet of drawings.

Figure 1 is a plan view of an improved indexing machine or fixture with adjacent portions of a drill press shown in section;

Figure 2 is a cross-sectional view taken particularly along the line 2—2 of Figure 1;

Figure 3 is a detail cross-sectional view of a table locking device taken substantially along the line 3—3 of Figure 2;

Figure 6 is a detail plan view of an indexing ring;

Figure 7 is a detail plan view of a blocking ring;

Figure 4:
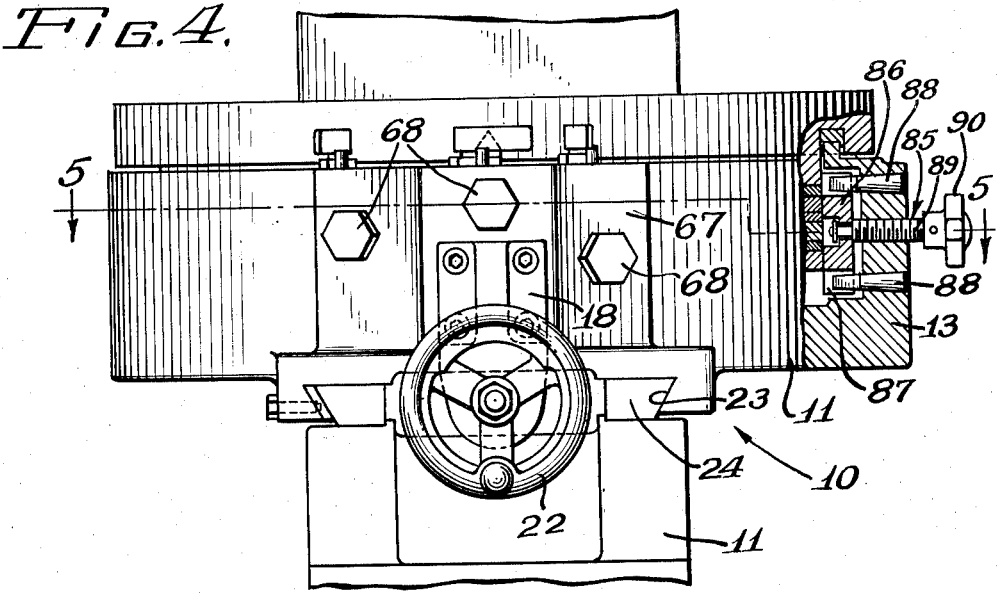
Figure 4 is a front elevational view of the rotary indexing table shown in Figures 1 and 2, the said view having portions broken away to show a braking device for the rotary table.

Figures 8 through 12 inclusive are diagrammatic views showing the various combinations of holes which may be drilled by the utilization of the rings shown in Figures 6 and 7;

Figure 13 is a detail plan view of another indexing ring;

Figure 14 is a plan view of another blocking ring;

Figures 15 through 18 inclusive are diagrammatic views showing the various combinations of holes which may be drilled by the utilization of the ring shown in Figures 13 and 14;

Figure 19 is a detail plan view of another indexing ring;

Figure 20 is a detail plan view of another blocking ring; and

Figures 21 through 24 are diagrammatic views showing the various combinations which may be drilled by the utilization of the rings shown in Figures 19 and 20.

Referring now particularly to Figures 1 through 4 an indexing device or fixture is generally designated by the reference character 10. The device 10 comprises a base 11 connected to a lower plate 12. The base 11 includes a cylindrical housing 13 having a cylindrical cavity 14. The base 11 is provided with a longitudinally extending recess 15 and a threaded block 16 is suitably connected, within the recess 15, to the base 11 by means of set screws 17. The base is provided at its forward end with a bracket 18 to which a lead screw 19 is connected by means of a bearing element 20 and a collar 21. A hand wheel 22 is suitably connected to the screw 19, the said screw also being threaded through the block 16 whereupon rotation of the handle 22, the housing 13 may be reciprocated relative to the base 11 thereby adjusting the longitudinal position of a rotary table designated generally at 25.

The rotary table 25 includes at its upper portion a work-holding surface 26. A spindle 27 is connected by means of a bracket 28, within a recess 28' to the table 25. A connecting stub 29 projects upwardly from the recess 28', the said connecting stub being adapted to center a work piece on the work holding surface 26. The spindle 27 rotates in a bearing 30 suitably connected to the housing 13. The lower end of the shaft 27 is threaded and a nut 31 suitably retains the spindle 27 within the bearing 30.

The rotary table 25 is also supported by means of a bearing ring 33 connected to the housing 13 within the cavity 14. A retainer plate 34 is provided with a plurality of circumferentially spaced openings 35 as indicated in Figures 1 and 2, the openings serving to house a plurality of steel balls 36.

The rotary table 25 includes a reduced body portion 37 disposed within the cylindrical cavity 14. The body portion 37 includes a circumferentially extending shoulder or reduced diameter portion 38. A plurality of vertically spaced indexing rings 39, 40 and 41 are positioned within the reduced diameter portion 38 and are securely connected to the table 25 against relative rotation, but for rotation therewith, by means of a plurality of bolts 42, one of which is shown in Figure 2. Blocking rings 43, 44 and 45 are positioned on top of each respective indexing rings 39, 40 and 41. The blocking rings 43, 44 and 45 are best shown in Figures 7, 14 and 20. Likewise the indexing rings 39, 40 and 41 are shown in detail in Figures 6, 40 and 41.

Figure 5:
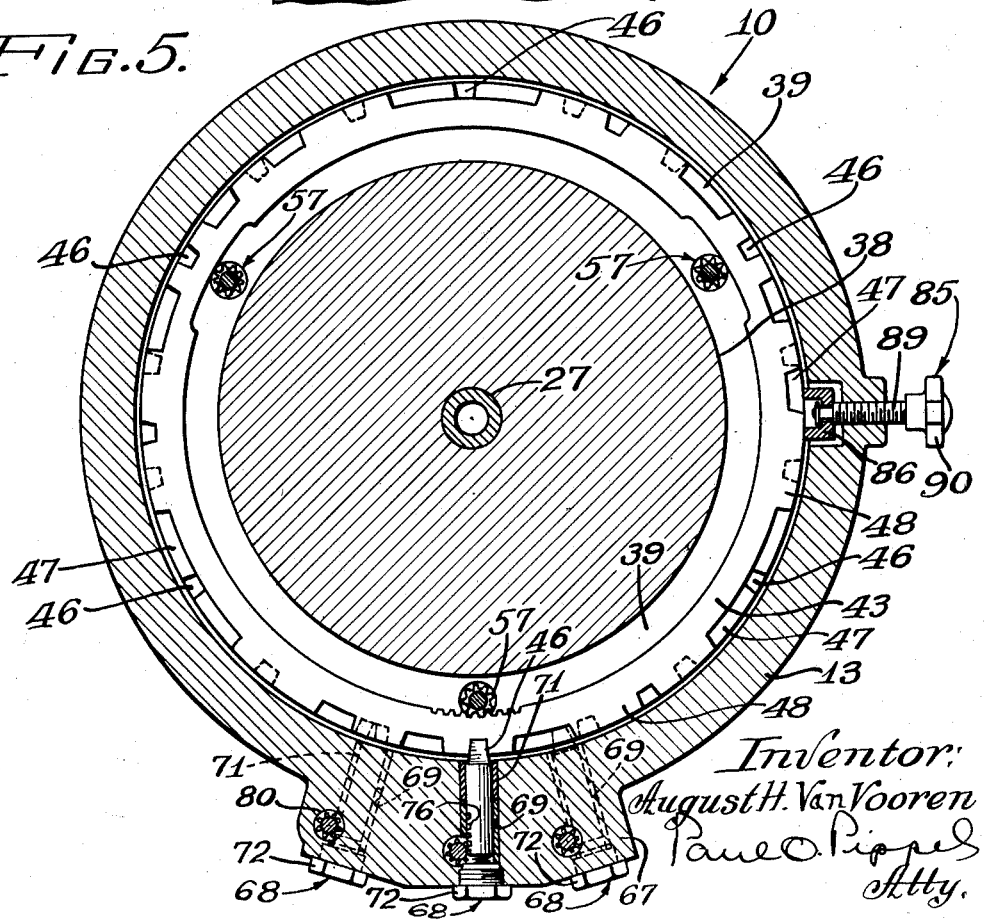
Figure 5 is a cross-sectional view taken along the line 5—5 of Figure 4.

Referring now to Figures 5 and 6 the indexing ring 39 is provided with a plurality of peripherally located and circumferentially extending openings or open end notches 46. The blocking ring 43 also is provided with a plurality of circumferentially disposed recesses or openings 47 separated by various size blocking portions or elements designated at 48. The blocking ring 43 also includes on its inner periphery a plurality of rack teeth 49.

In Figure 19 the indexing ring 40 includes a plurality of open end notches or indexing means 50. The blocking member 44 shown in Figure 20 has at its periphery a plurality of circumferentially extending openings or recesses 51 separated by a plurality of blocking portions or elements 56. The inner peripheral edge of the blocking ring 44 includes a plurality of rack teeth 53.

The indexing ring shown in Figure 13 includes a plurality of peripherally disposed and circumferentially spaced open end slots or notches 54. The blocking ring 45 shown in Figure 14 includes a plurality of recesses 55 separated by blocking elements 56.

As shown in Figure 2 a blocking ring adjustment mechanism generally designated at 57, is positioned within a bore 58 provided in the table 25. As indicated in Figures 1 and 5, three of these adjusting mechanisms 57 are positioned in spaced relation on the table 25. All of the mechanisms 57 are substantially similar and they are adapted to individually rotate each of the blocking rings independently of each other and with respect to the indexing rings. A spindle 59 is rotatably positioned within each bore 58. The spindle 59 includes a wrench recess 60 and a pinion 61 is suitably supported on a sleeve 62 rotatable in a bearing 63. The bearing 63 is suitably supported on the lower indexing ring 41. The spindle 59 includes a threaded shaft portion 65 to which a nut 66 is suitably threaded for rotatably securing the spindle 59 with respect to the table 25. The upper end of the spindle 59 is also suitably supported by means of a bearing 64 retained within the table 25. As indicated in Figure 2 the pinion 61 is adapted to mesh with the rack teeth 49 of the blocking ring 43. The blocking ring adjustments 57 for blocking rings 44 and 45 are identical in construction with the exception that the pinions 61 are located on the spindles 59 below the vertical level of the adjustment just described and at the level of the receptive blocking rings so that the pinions 61 suitably engage the rack teeth 49, 53 and 56' respectively of the blocking rings 43, 44 and 45. In other words, it is of course apparent from Figure 2 that the blocking rings 43, 44 and 45 are vertically spaced and the respective pinions 61 for moving the said rings must also be positioned in the proper height relation to engage the respective rack teeth 49, 53 and 56'.

The housing 13 is also provided with a projecting support 67 which supports a plurality of table locking elements 68. The locking elements 68 are identical in construction and only the location with respect to vertical height is different as best indicated in Figure 4. Each locking element 68 is adapted to respectively engage an indexing element located at the same height as the said adjacent locking mechanism 68. Each locking device 68 comprises a horizontal bore 69 in the projection 67. Each locking mechanism also includes a vertical bore 70. A sleeve 71 is disposed within the horizontal bore and a spring retainer groove 72 is screwed into the bore 69. A plunger 73 is reciprocally positioned within the sleeve 71, the said plunger including a pawl 73'. The plunger 73 is also provided with a longitudinally extending bore 74 in which a spring 75 is positioned, the said spring being suitably retained by means of a spring retainer 72. As best indicated in Figure 5 each plunger 73 includes a plurality of rack teeth 76. As indicated in Figure 3a shaft 77 is positioned within the bore 70 and is journalled on a bearing 78. A bearing retainer 79 also suitably positions the shaft 77. A pinion 80 is connected for rotation with the shaft 77, the said pinion 80 meshing with the rack 76. A handle 81 includes a slotted portion 82, the said handle 81 being pivotally connected to the shaft 77 as indicated at 83. Each of the locking mechanisms 68 also includes a stop element 84 best shown in Figure 1.

Referring now particularly to Figures 4 and 5 a brake generally designated at 85 suitably operates to limit the degree of freeness with which the table 25 may be rotated. The brake 85 includes a brake element 86 provided with recesses 87 engaged by guide elements 88 connected to the housing 13. A screw 89 is connected to the brake element 86 and is threaded to the housing 13, a set screw 89 being rotatable by means of a knob 90 for moving the brake element 86 into an out-of-engagement position with respect to the rotary table 25.

The device 10 includes a vertical pedestal 91 supported on the base 11. The pedestal 91 is adapted to support one or more drill spindles 92 in a conventional manner. The indexing device 10 may be integral with the drilling mechanism suitably powered or it may be separate of a drilling mechanism and may be so designed at the base that it may be placed upon the head of a drill press or other machining elements in a portable manner.

In operation the indexing device 10 is particularly useful in the locating of work pieces such as clutches, flywheels, etc. Such work pieces generally require a plurality of circumferentially spaced mounting holes which must be drilled in the work piece. The table 25 is readily adapted for locating such work pieces in position for drilling operation and it is readily adjustable for different locations wherein the work pieces are desired to contain openings or bores of different spacing. The work piece may be suitably supported in the surface 26 by attaching the same by any conventional means to the connecting stubs 29. As indicated in Figure 2 the indexing rings 39, 40 and 41 are respectively positioned in contiguous relation with respect to the blocking rings 43, 44 and 45. Thus when the blocking ring 45 is positioned on top of an indexing ring it is apparent as shown in Figure 5, that certain of the notches in the indexing ring may be exposed wherein other notches in the indexing ring are suitably blocked by means of the blocking elements of each blocking ring. Thus as shown in Figure 5 the blocking ring 43 has been positioned to expose 6 notches 46, and the other notches 46 of the indexing ring 39 are blocked. Thus in Figure 5 the pawl 73' of one of the stop mechanisms 68 is in engagement with one of the notches 46. Thus the work is positioned with relation to the spindle 92 so that one hole may be drilled. By rotating the shaft 47 the pawl 73' which is engaged and the respective plunger 73 may be moved away from the opening 46 whereupon the table and the work thereon can now be rotated until the next exposed notch 46 is in alignment with the pawl whereupon the spring 75 urges the pawl again into engagement with the exposed notch 46 whereupon the table is positioned for the next hole to be drilled. In other words the blocking rings are effective to expose certain notches and each ring may be moved to a number of positions for blocking certain notches and exposing others. Referring now to Figures 8, 9, 10, 11 and 12, these views show in diagrammatic form the minimum and maximum number of positions which may be accomplished by moving the blocking ring 43 relative to the indexing ring 39. Likewise Figures 21, 22, 23 and 24 show the number of positions which may be accomplished by relative rotation of the ring 44 relative to the ring 40. The same is true of Figures 15, 16, 17 and 18 diagrammatically showing the number of positions which may be accomplished by relative movement of the ring 45 with respect to the ring 41. The number of positions, of course, at which the table may be positioned depending upon the position of the blocking ring relative to the indexing ring, is equal to the number of holes which are desired to be drilled in the work piece. Thus it is apparent that the indexing table, by suitable adjustment of the blocking rings may serve to position the work in a manner wherein as few as three holes may be drilled and as many as 24 holes may be drilled.

Adjustment of each blocking ring relative to each indexing ring is accomplished by the blocking ring adjustment mechanism 57. A suitable key is inserted into the wrench recess 60 and upon turning of the spindle 59 the pinion 61 meshes with the rack teeth of one of the blocking rings for rotating the same relative to the adjacent indexing ring. Thus since there are three of these adjusting mechanisms each blocking ring may be adjusted independently of the other and with respect to each adjacent indexing ring. By adjusting the brake 85 the table may spin quite freely or it may be allowed to have a certain amount of drag as effected by the braking mechanism.

Thus for instance if the operator has 10 or 15 flywheels which must be drilled with a certain number of holes with a certain spacing he merely adjusts the adjusting mechanism so that one of the blocking rings is placed in the particular position desired for effectuating the number of holes to be drilled. Suitable indicing marking may be placed adjacent each adjusting mechanism 57 on the surface of the table so that the operator will know the extent of turning movement necessary of the spindle 59 to secure the desired number of positions. Now if other flywheels arrive for drilling, it is a simple matter to adjust one of the adjusting mechanisms to accommodate the number of holes required to match the other clutch plate. Each of the table locking mechanisms 68 may be locked out of position by simply turning them to a maximum counterclockwise position as indicated in Figure 1 wherein the stops 84 retain the handles 81 as indicated and the respective plungers 73 are held against the action of the spring 75 in an out-of-engagement position. Depending on which indexing ring is to be utilized it is a simple matter to lift up one of the handles 81 above the stop 84 to place the same in operative position relative to the desired indexing ring.

Thus it is readily apparent that an improved indexing mechanism has been described. The objects of the invention have thus been fully achieved and it must be understood that changes and modifications may be made without departing from the spirit of the invention as disclosed or the scope thereof as defined in the appended claims.

What is claimed is:

1. A work indexing device for drilling machines and the like comprising a base adapted to be supported underneath the spindle of a drill press, a table supported on said base for relative rotation about a vertical axis, said table having a work holding surface, a plurality of vertically spaced indexing rings rigidly connected to said table in coaxial relation for rotation therewith, said indexing rings each having an outer peripheral edge including a plurality of circumferentially spaced open end notches, the number of notches and spacing thereof of each ring varying with respect to the other, a plurality of vertically spaced blocking rings supported on said table for relative rotation with respect thereto, each blocking ring being coaxial with and positioned adjacent an indexing ring, each blocking ring having a peripheral edge including a plurality of open end circumferentially spaced recesses and a plurality of blocking elements positioned between said recesses, the recesses and blocking elements of one blocking ring varying with respect to the other blocking rings, a plurality of rack teeth on each blocking ring, means for rotating each blocking ring with respect to the table and with respect to each indexing ring comprising, a plurality of rotatable members connected to said table, each rotatable member including a gear meshing with the rack teeth of one of said blocking rings, means connected to each rotatable member for rotating said gear thereby rotating each blocking ring relative to each indexing ring to a variety of positions whereby said recesses register with certain of the notches to expose the same and said blocking elements block certain of said notches, means for holding said table against rotation in a number of positions equal to the exposed notches of one of said rings including a plurality of vertically spaced pawl elements reciprocally connected to said base, and means adapted to move each of said pawl elements into engagement with one of said exposed notches whereby said table and work carried on the work holding surface is fixedly held.

2. A work indexing device for drilling machines and the like comprising a base adapted to be supported underneath the spindle of a drill press, a table supported on said base for relative rotation about a vertical axis, said table having a work holding surface, a plurality of vertically spaced indexing rings rigidly connected to said table in coaxial relation for rotation therewith, said indexing rings each having a plurality of circumferentially spaced notches, the number of notches and spacing thereof of each ring varying with respect to the other, a plurality of vertically spaced blocking rings supported on said table for relative rotation with respect thereto, each blocking ring being coaxial with and positioned adjacent an indexing ring, each blocking ring having a plurality of circumferentially spaced recesses and a plurality of blocking elements positioned between said recesses, the recesses and blocking elements of one blocking ring varying with respect to the other blocking rings, a plurality of rack teeth on each blocking ring, means for rotating each blocking ring with respect to the table and with respect to each indexing ring comprising, a plurality of rotatable members connected to said table, each rotatable member including a gear meshing with the rack teeth on one of said blocking rings, means connected to each rotatable member for rotating said gear thereby rotating each blocking ring relative to each indexing ring to a variety of positions whereby said recesses register with certain of the notches to expose the same and said blocking elements block certain of said notches, means for holding said table against rotation in a number of positions equal to the exposed notches of one of said rings including a plurality of vertically spaced pawl elements reciprocally connected to said base, and means adapted to move each of said pawl elements into engagement with one of said exposed notches whereby said table and work carried on the work holding surface is fixedly held.

3. A work indexing device for drilling machines and the like comprising a base adapted to be supported underneath the spindle of a drill press, a table supported on said base for relative rotation about a vertical axis, said table having a work holding surface, a plurality of vertically spaced indexing rings connected to said table for rotation therewith, said indexing rings each having a plurality of circumferentially spaced notches, the number of notches and spacing thereof of each ring varying with respect to the other, a plurality of vertically spaced blocking rings supported on said table for relative rotation with respect thereto, each blocking ring being coaxial with and positioned adjacent an indexing ring, each blocking ring having a plurality of circumferentially spaced recesses and a plurality of blocking elements positioned between said recesses, the recesses and blocking elements for one blocking ring varying with respect to the other blocking rings, means for rotating each blocking ring with respect to the table and with respect to each indexing ring comprising, a plurality of rotatable members connected to said table, each rotatable member including means rotatably engaging said blocking rings for rotating each blocking ring relative to each indexing ring to a variety of positions whereby said recesses register with certain of the notches to expose the same and said blocking elements block certain of said notches, means for holding said table against rotation in a number of positions equal to the exposed notches of one of said rings including a plurality of vertically spaced pawl elements reciprocally connected to said base, and means adapted to move each of said pawl elements into engagement with one of said exposed notches whereby said table and work carried on the work holding surface is held against rotation.

4. An indexing device comprising a base having a cylindrical housing, a rotary table having a work holding surface, a body portion on the table disposed in said housing, a spindle supported on said base, said table being supported on said spindle for rotation on said base, an indexing member fixedly supported on said table for rotation therewith, said indexing member having a plurality of circumferentially disposed first openings, a blocking member supported on said table for relative rotation with respect to said indexing member, said blocking member including a plurality of second openings adapted to register with the first openings, a plurality of blocking means on said blocking member adapted to block said first openings, means for rotating said blocking member relative to said indexing member to a number of positions where in each position certain of said first openings register with certain second openings and certain first openings are blocked by said blocking means, said rotating means comprising a rotatable member connected to said table, and means for holding said table in a number of rotated positions relative to said base, said means comprising a movable pawl supported on said base, said pawl being adapted in an operating position to engage said first unblocked openings, and means for locking said pawl in an inoperative position wherein said table may be freely rotated.

5. An indexing device comprising a base, a rotary table having a work holding surface rotatably supported on said base, an indexing member fixedly supported on said table for rotation therewith, said indexing member having a plurality of circumferentially disposed openings, a blocking member supported on said table for relative rotation with respect to said indexing member, a plurality of blocking means on said blocking member adapted to block said openings, engageable means on said blocking member, movable means associated with said table and engaging said engageable means for rotating said blocking member relative to said indexing member to a number of positions where in each position certain of said openings are blocked by said blocking means and others are unblocked, and means for holding said table in a number of rotated positions relative to said base, said means comprising a movable member supported on said base, said movable member being adapted to engage said unblocked openings.

References Cited in the file of this patent
UNITED STATES PATENTS

| | | |
|---|---|---|
| 2,144,486 | Erb | Jan. 17, 1939 |
| 2,295,022 | Yanchek | Sept. 8, 1942 |